United States Patent [19]

Ukita

[11] Patent Number: 4,924,518

[45] Date of Patent: May 8, 1990

[54] PHONEME SIMILARITY CALCULATING APPARATUS

[75] Inventor: Teruhiko Ukita, Chigasaki, Japan

[73] Assignee: Kabushiki Kaisha Toshiba, Kawasaki, Japan

[21] Appl. No.: 133,808

[22] Filed: Dec. 16, 1987

[30] Foreign Application Priority Data

Dec. 23, 1986 [JP] Japan ............... 61-306769

[51] Int. Cl.$^5$ ............... G10L 7/02; G10L 9/06
[52] U.S. Cl. ............... 381/41; 381/45
[58] Field of Search ............... 381/41–43; 364/513.5

[56] References Cited

U.S. PATENT DOCUMENTS

| | | | |
|---|---|---|---|
| 3,816,722 | 6/1974 | Sakoe et al. | 381/42 |
| 4,400,828 | 8/1983 | Pirz et al. | 381/43 |
| 4,467,437 | 8/1984 | Tsuruta et al. | 381/43 |
| 4,479,236 | 10/1984 | Sakoe | 381/43 |
| 4,592,085 | 5/1986 | Watari et al. | 381/43 |
| 4,677,672 | 6/1987 | Ukita et al. | 381/43 |
| 4,677,673 | 6/1987 | Ukita et al. | 381/43 |
| 4,707,858 | 11/1987 | Fette | 381/43 |
| 4,718,095 | 1/1988 | Asakawa et al. | 381/43 |

OTHER PUBLICATIONS

Klatt, "A Digital Filter for Spectral Matching", IEEE ICASSP, Apr. 1976, pp. 573–576.
Proc. International Conference Acoustics, Speech, Signal Processing, 42.19, "VCV Segmentation and Phoneme Recognition in Continuouos Speech", Hataoka et al.: Apr. 1986.

Primary Examiner—Gary V. Harkcom
Assistant Examiner—David D. Knepper
Attorney, Agent, or Firm—Oblon, Spivak, McClelland, Maier & Neustadt

[57] ABSTRACT

Continuous speech is input to an acoustic analyzer comprising a filter bank which filters (acoustically analyzes) the input speech and outputs from each filter a characteristic parameter vector of the input speech. The acoustic analyzer also calculates a steadiness parameter which is proportional to a reciprocal of a change in the spectrum of the input speech and represents steadiness of the input speech. the feature parameter vector is input to an initial similarity calculator, and a similarity (initial similarity) to each reference phoneme pattern stored in a reference phoneme pattern memory is calculated using a multiple similarity method. The initial similarity is input to a similarity normalizing circuit, and is normalized (weighted) based on the steadiness parameter in order to reflect information representing steadiness or unsteadiness of a phoneme into the similarity. For a steady reference phoneme, weighting is increased when the steadiness parameter increases and is decreased when the steadiness parameter decreases. For an unsteady reference phoneme, weighting is increased when the steadiness parameter decreases and is decreased when the steadiness parameter increases.

15 Claims, 3 Drawing Sheets

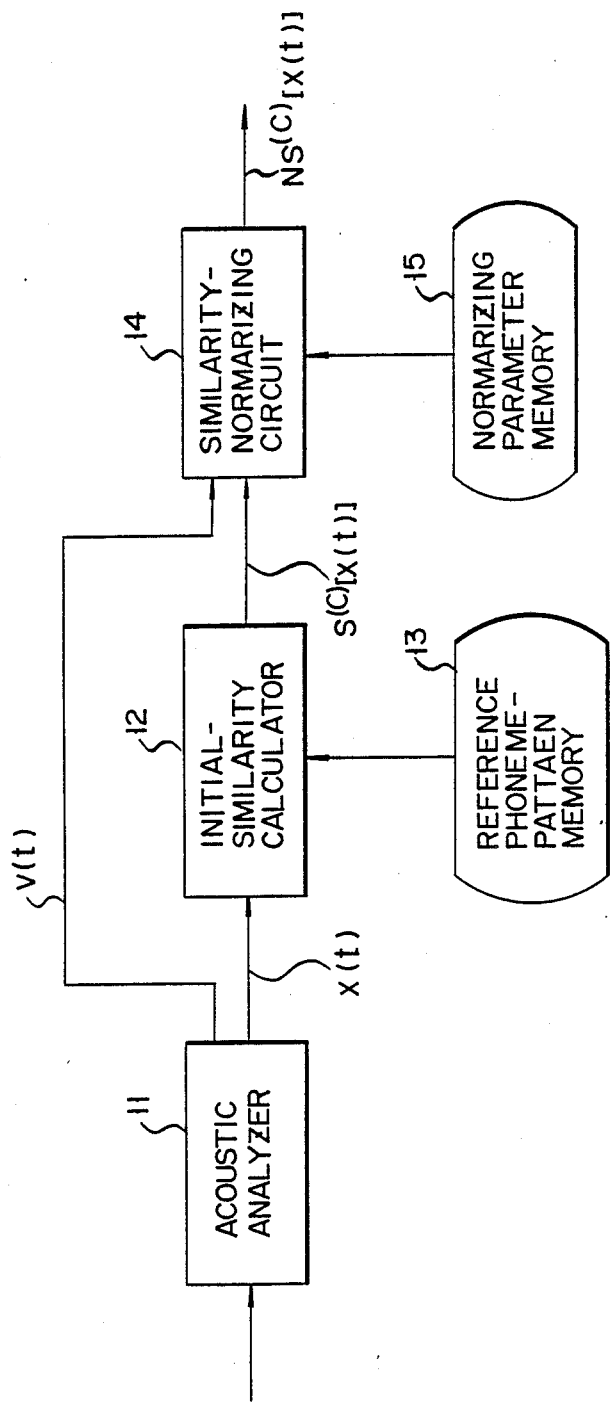
F I G. 1

PHONEME SIMILARITY CALCULATING APPARATUS

BACKGROUND OF THE INVENTION

The present invention relates to a phoneme similarity calculating apparatus for calculating a similarity (which herein includes both a similarity in a narrow sense which is increased as a feature parameter resembles a corresponding phoneme more closely, and a distance which is decreased as the parameter resembles a corresponding phoneme more closely) of a feature parameter of input speech in each frame of a predetermined time to each phoneme in a speech recognition apparatus or a speech learning apparatus.

Upon recognition of continuous speech, since an object to be recognized is input in units of words or sentences, it is important how a phoneme structure of input speech is determined. For this purpose, a phoneme similarity calculation is necessary.

Since the sound produced as the human voice is continuously changed, a feature parameter extracted from a speech signal is continuously changed over time.

In a conventional phoneme recognition method, reference phoneme patterns or statistic identification functions are prepared for every phoneme class, and input speech is matched with these patterns or functions for each frame to calculate a phoneme similarity. Note that the phoneme class means a classification unit of phonemes such as k, f, and the like.

Although phonemes include steady phonemes, such as vowels or nasal sounds which are not significantly changed, and unsteady phonemes, such as plosives which are abruptly changed, a phoneme similarity is calculated regardless of steadiness and unsteadiness in each frame of input speech in the above-mentioned matching. Therefore, a similarity to another phoneme class may be accidentally increased for a so-called "glide" segment between adjacent phonemes in the input speech, and a phoneme may be erroneously recognized.

In the conventional phoneme similarity calculating apparatus, since a similarity is calculated using a reference pattern regardless of the steadiness and unsteadiness of the phoneme class, an incorrect similarity is often calculated.

SUMMARY OF THE INVENTION

It is an object of the present invention to provide a phoneme similarity calculating apparatus which can accurately calculate a similarity to each phoneme class of input speech in accordance with steadiness of the phoneme class.

A phoneme similarity calculating apparatus according to this invention comprises an acoustic analyzer for calculating a feature parameter of input speech for every predetermined frame of a predetermined time, and calculating a steadiness parameter indicating steadiness of the input speech in accordance with a change in the feature parameter; an initial similarity calculator for calculating a similarity of the feature parameter for each phoneme category by matching between the feature parameter and a reference phoneme pattern for each phoneme category; and a similarity normalizing circuit for correcting the initial similarity in accordance with the steadiness parameter and whether or not the phoneme category are steady.

BRIEF DESCRIPTION OF THE DRAWINGS

FIG. 1 is a block diagram schematically showing a phoneme similarity calculating apparatus according to an embodiment of the present invention;

DETAILED DESCRIPTION OF THE PREFERRED EMBODIMENT

Figure 2A:
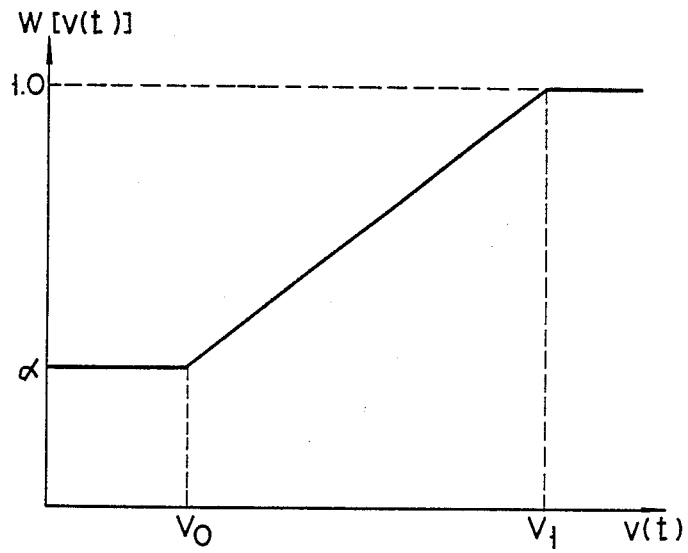
FIGS. 2A and 2B are graphs showing normalizing functions used in this embodiment.

A phoneme similarity calculating apparatus according to an embodiment of the present invention will now be described with reference to the accompanying drawings. Continuous speech is input to acoustic analyzer 11. Acoustic analyzer 11 comprises a filter bank which is known as a means for spectrum analysis. The filter bank has a plurality of bandpass filters having different center frequencies. The filter bank filters (acoustically analyzes) input speech for every predetermined analysis time period (frame) and outputs an energy of an output value of each channel (each filter) of the filter bank as a feature parameter vector. The following processing is performed for every frame. As acoustic analyzer 11, a circuit for performing Fourier transformation or a circuit for calculating a linear partial correlation may be utilized.

Acoustic analyzer 11 calculates a steadiness parameter indicating steadiness of input speech as well as outputting of the feature parameter vector. The steadiness parameter represents a degree of change in the spectrum of the input speech. In this sense, it can be regarded that phonemes such as vowels or nasal sounds which are less changed are steady, and phonemes such as plosives which are abruptly changed are unsteady. If the feature parameter vector of a (t)th frame is given by $x(t)$, steadiness parameter $v(t)$ of the (t)th frame is calculated as follows:

$$v(t) = \|x(t)\| / \|x(t-T) - x(t)\| \quad (1)$$
$$(\text{if } \|x(t-T) - x(t)\| > 0)$$
$$= \infty \; (\text{if } \|x(t-T) - x(t)\| = 0)$$

where $\|X\|$ is a norm of vector $x$. Period T can be set to fall within the range of 10 to 50 msec. As can be seen from equation (1), steadiness parameter $v(t)$ is proportional to a reciprocal of a change in the spectrum of the input speech during period T.

Feature parameter vector $x(t)$ obtained by acoustic analyzer 11 is input to initial similarity calculator 12. Similarity (in the narrow sense) to each reference phoneme pattern stored in reference phoneme pattern memory 13 is calculated in calculator 12. As the similarity calculation method, a known multiple similarity method can be employed. In the multiple similarity method, a covariance matrix is calculated beforehand from sample pattern vectors associated with a large number of phonemes, and an eigen value and an eigen vector of the covariance matrix are stored as a reference pattern for each phoneme. Then, similarity $s^{(c)}[x(t)]$ to phoneme category is calculated by the following equation using input characteristic parameter vector $x(t)$:

$$S^{(c)}[x(t)] = \{\Sigma \lambda m(c) \cdot (x(t), \phi m(c))^2\} / \{\lambda 1(c) \cdot \|x(t)\|^2\} \quad (2)$$

where $\lambda m(c)$ is an (m)th eigen value of the covariance matrix for category c, and $\phi m(c)$ is an eigen vector when the norm is normalized to 1. $(x(t), \phi m(c))$ is an inner product of $x(t)$ and $\phi m(c)$. With the above equation (2), a similarity for each phoneme (since this similarity cannot be directly used in phoneme recognition, it is called an initial similarity) is calculated.

Initial similarity $S^{(c)}[x(t)]$ is input to similarity normalizing circuit 14, and is normalized in accordance with steadiness parameter $v(t)$ obtained by acoustic analyzer 11. Here, normalization is a weighting for reflecting similarity information in accordance with the steadiness or unsteadiness of a phoneme. More specifically, the covariance matrix, as a base of eigen value $\lambda m(c)$ and eigen vector $\phi m(c)$ both used in the calculation of the initial similarity, is constituted by samples extracted from speech patterns belonging to respective phoneme categories. However, these samples are either steady or unsteady depending on the types of phoneme. For this reason, it is impossible to calculate the similarity by the same calculation method with respect to all the phonemes. Therefore, for steady phonemes such as vowels, nasal sounds and the like, if the steadiness parameter of input speech is large, the similarity is preferably corrected to be a large value, and, on the contrary, if the steadiness parameter is small, it is preferably corrected to be a small value, since patterns extracted from a steady portion of the input speech are used as reference patterns. Similarly, for unsteady phonemes such as plosives, if the steadiness parameter of the input speech is small, the similarity is preferably corrected to be a large value, and if the steadiness parameter is large, it is preferably corrected to be a small value. The output from similarity normalizing circuit 14 is supplied to a word similarity calculator although not shown, and is used for word recognition.

Figure 2B:
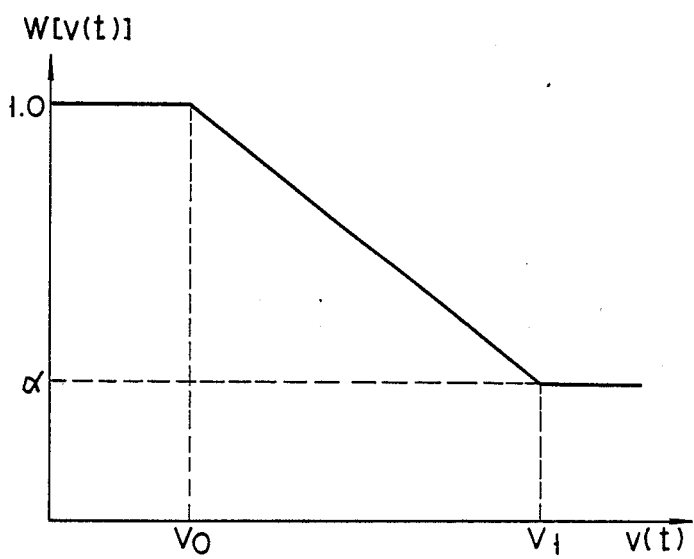

Therefore, the initial similarity $S^{(c)}[x(t)]$ for a steady phoneme can be normalized (weighted) by normalizing function $w[v(t)]$ which is increased in proportion to an increase in steadiness parameter $v(t)$, as shown in FIG. 2A. On the other hand, the initial similarity $S^{(c)}[x(t)]$ for an unsteady phoneme can be normalized by normalizing function $w[v(t)]$ which is decreased upon an increase in steadiness parameter $v(t)$, as shown in FIG. 2B. Normalized similarity $NS^{(c)}[x(t)]$ finally obtained by this normalization is expressed as follows:

$$NS^{(c)}[x(t)] = S^{(c)}[x(t)] \, w[v(t)] \quad (3)$$

where normalizing function $w[v(t)]$ is selected as follows as shown in FIGS. 2A and 2B.

For a steady phoneme:

$$\begin{aligned} w[v(t)] &= \alpha \text{ (if } v(t) < v_0) \\ &= \{S[x(t)] - v_0)(1 - \alpha)\}/(v_1 - v_0) + \alpha \\ &\quad (\text{if } v_0 \leq v(t) \leq v_1) \\ &= 1 \text{ (if } v_1 < v(t)) \end{aligned} \quad (4)$$

For an unsteady phoneme:

$$\begin{aligned} w[v(t)] &= 1 \text{ (if } v(t) < v_0) \\ &= 1 - \{S[x(t)] - v_0)(1 - \alpha)\}/(v_1 - v_0) \\ &\quad (\text{if } v_0 \leq v(t) \leq v_1) \\ &= \alpha \text{ (if } v_1 < v(t)) \end{aligned} \quad (5)$$

The normalizing function is set to be a nonlinear function so that the normalized similarity is not abruptly changed upon an abrupt change in steadiness parameter of speech, and stable normalization can be performed. Parameters $v_0$ and $v_1$ for determining an inclination of normalizing function $w[v(t)]$ can be calculated from a reference phoneme parameter distribution prepared in advance. Parameter $\alpha$ can be set to be an appropriate value, e.g., 0.5. These normalizing parameters ($v_0$, $v_1$, $\alpha$) are stored in normalizing parameter memory 15. Similarity normalizing circuit 14 determines which one of the normalizing functions shown in FIG. 2A or 2B is to be used in accordance with the phoneme category of each phoneme similarity supplied from initial similarity calculator 12, and also determines a normalizing function value in accordance with steadiness parameter $v(t)$. Then, circuit 14 normalizes the initial similarity based on equation (3).

According to this embodiment as described above, when the similarity of a steady phoneme such as a vowel or nasal sound is to be calculated, the initial similarity is relatively increased if the input speech is steady, and is relatively decreased if the input speech is unsteady. When the similarity of an unsteady phoneme such as a fricative is to be calculated, the initial similarity is relatively decreased if the input speech is steady, and is relatively increased if the input speech is unsteady. As a result, a phoneme recognition error due to an accidental increase in similarity to a steady phoneme class at an unsteady portion of input speech, e.g., a so-called "glide" portion between adjacent phonemes can be prevented.

Figure 3A:
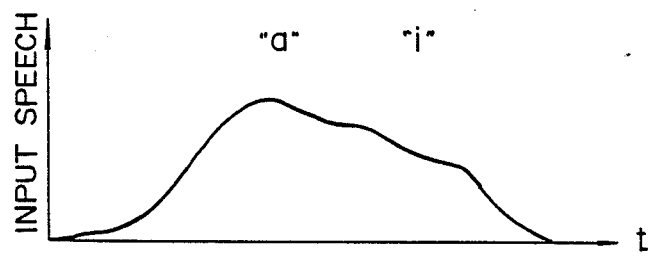
FIGS. 3A to 3D represent signal waveforms for explaining the overall operation of this embodiment.
Figure 3B:
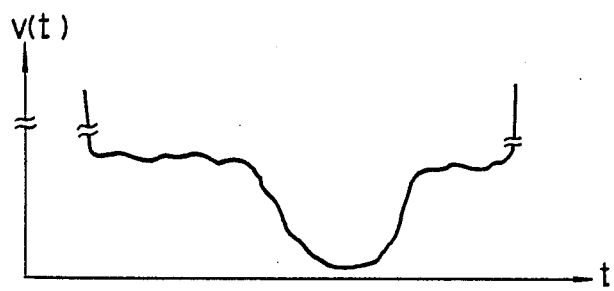
Figure 3C:
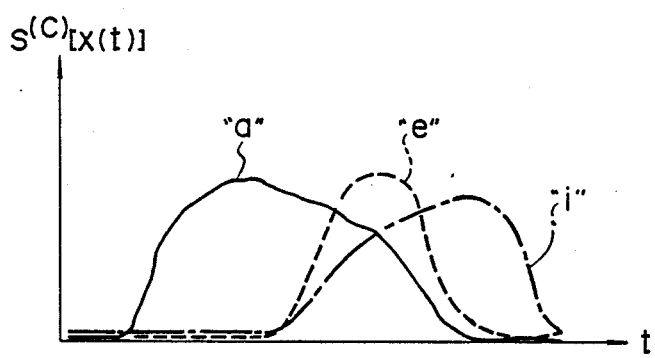
Figure 3D:
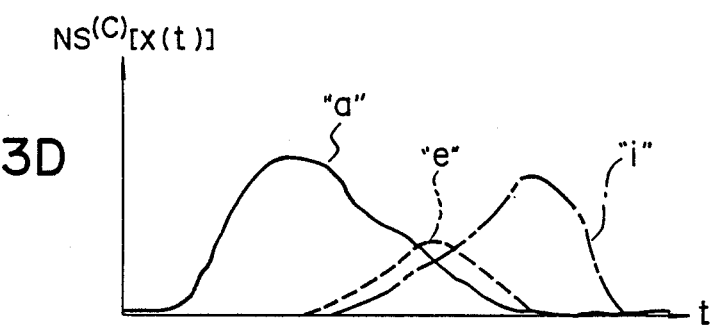

The effect of this embodiment will now be described with reference to FIGS. 3A to 3D. For example, as shown in FIG. 3A, assume that vowels "a" and "i" (Japanese) are continuously uttered. In this case, a large initial similarity value of "e" (Japanese) may be accidentally and frequently obtained at a boundary (glide) between vowels "a" and "i", as shown in FIG. 3C. The initial similarity is corrected by the normalizing function shown in FIG. 2A or 2B. Steadiness parameter $v(t)$ at the boundary portion at which the large initial similarity value "e" is obtained is small, as shown in FIG. 3B. Therefore, at this boundary portion, the normalizing function value for a steady phoneme is decreased, as shown in FIG. 2A, and the normalizing function value for an unsteady phoneme is increased, as shown in FIG. 2B. Though, "e" belongs to the steady phoneme category, the normalized similarity of "e" at the glide portion having the large initial similarity can be decreased relative to the steady portion which represents a vowel feature, as shown in FIG. 3D.

In contrast to this, "a" and "i" are steady phonemes, and steadiness parameters $v(t)$ at these portions are large as shown in FIG. 3B. Therefore, the normalized similarities of "a" and "i" can be relatively increased at a steady portion and can be relatively decreased at a glide portion, as shown in FIG. 3D.

As a result, when the similarity calculation for input speech is performed, the similarity of a phoneme category can be obtained depending on the situation, and an improvement of a phoneme recognition probability can be expected.

In this embodiment, only the steadiness of a category is taken into account, two normalizing functions are prepared regardless of the types of category, and one of these functions is selected in accordance with whether or not a phoneme is steady. However, normalizing functions can be prepared for each category. In this case, a normalizing function is expressed by $w^{(c)}[v(t)]$ instead of $w[v(t)]$.

In the above description, a similarity in a narrow sense is used as phoneme information. However, a distance may be employed. In this case, initial similarity calculator 12 and similarity normalizing circuit 14 shown in FIG. 1 can be replaced with an initial distance calculator and a distance normalizing circuit, respectively. For example, if Mahalanobis distance is employed, an initial distance is calculated as follows:

$$D^{(c)}[x(t)] = (x(t) - \mu(c))\Sigma^{(c)-1}(x(t) - \mu(c))^T \quad (6)$$

where $\mu(c)$ is an average vector of training samples belonging to a (c)th category, and $\Sigma(c)$ is its covariance matrix.

Normalizing function $w'[v(t)]$ is multiplied with the initial distance calculated as described above, thereby normalizing the initial distance. It should be noted that contrary to the case of similarity, in the case of a distance, the normalizing function shown in FIG. 2B is used for a steady phoneme, and a function shown in FIG. 2A is used for an unsteady phoneme. This is because the similarity is increased as parameters resemble a phoneme more closely, while a distance is decreased as parameters resemble a phoneme more closely.

According to the present invention as described above, since a phoneme similarity is calculated in accordance with steadiness or unsteadiness in each frame of input speech, an error in calculating a similarity for a steady phoneme class at a so-called "glide" portion between adjacent phonemes of the input speech and recognizing the phoneme is prevented. Therefore, a phoneme similarity calculating apparatus which can precisely calculate a similarity for each phoneme class of the input speech can be provided.

What is claimed is:

1. A phoneme similarity calculating apparatus comprising:
    means for calculating a feature parameter of input speech for every frame of a predetermined time;
    means for calculating a steadiness parameter indicating steadiness of the input speech for each frame in accordance with a change in the feature parameter;
    means for calculating a phoneme similarity of the feature parameter for each phoneme based on matching between the feature parameter and a reference phoneme pattern for each phoneme; and
    normalizing means for correcting said phoneme similarity calculated by said phoneme similarity calculating means in accordance with the steadiness parameter such that said phoneme similarity is increased if the steadiness parameter increases when the reference phoneme is a steady one, and is decreased if the steadiness parameter increases when the reference phoneme is an unsteady one.

2. An apparatus according to claim 1, in which said normalizing means comprises:
    means for multiplying a first weighting function which is proportional to the steadiness parameter with the phoneme similarity when the reference phoneme is a steady one, and
    means for multiplying a second weighting function which is inversely proportional to the steadiness parameter with the phoneme similarity when the reference phoneme is an unsteady one.

3. An apparatus according to claim 1, in which said phoneme similarity calculating means calculates a distance with respect to each reference phoneme pattern as the phoneme similarity, and
    said normalizing means multiplies a weighting function which is decreased upon an increase in steadiness parameter with the distance for a steady phoneme, and multiplies a weighting function which is increased upon an increase in steadiness parameter with the distance for an unsteady phoneme.

4. An apparatus according to claim 3, in which said similarity calculating means calculates the following Mahalanobis distance $D^{(c)}[x(t)]$ as the similarity:

$$D^{(c)}[x(t)] = (x(t) - \mu(c))\Sigma^{(c)-1}(x(t) - \mu(c))^T \quad (6)$$

where $\mu(c)$ is an average vector of training samples belonging to a (c)th category, and $\Sigma(c)$ is a covariance matrix of the training samples belonging to a phoneme c.

5. An apparatus according to claim 1, in which said feature parameter calculating means comprises a filter bank having a plurality of bandpass filters, having different center frequencies, for acoustically analyzing the input speech.

6. An apparatus according to claim 1, in which said steadiness parameter calculating means calculates steadiness parameter $v(t)$ of a (t)th frame as follow:

$$\begin{aligned} v(t) &= \|x(t)\| / \|x(t - T) - x(t)\| \\ &\quad (\text{if } \|x(t - T) - x(t)\| > 0) \\ &= \infty (\text{if } \|x(t - T) - x(t)\| = 0) \end{aligned}$$

where $\|x\|$ is the square root of the sum of the squares of the vector components for a vector x at the (t)th frame, $x(t)$ is a feature parameter vector of the (t)th frame, and T is an arbitrary period falling within a range of about 10 to 50 msec.

7. An apparatus according to claim 1, in which said similarity calculating means comprises a reference phoneme pattern memory for storing an eigen value and an eigen vector of a covariance matrix of a sample pattern vector associated with each phoneme as a reference pattern of each phoneme, and a circuit for calculating similarity $S^{(c)}[x(t)]$ for each phoneme c in accordance with feature parameter vector $x(t)$ as follows;

$$S^{(c)}[x(t)] = \{\Sigma \lambda m(c) (x(t), \phi m(c))^2\} / \{\lambda 1(c) \| x(t) \|^2\}$$

where $\lambda m(c)$ is an (m)th eigen value of the covariance matrix for phoneme c, $\Sigma$ is a summation in connection with m, $x[d](t)$ is a feature parameter vector of the (t)th frame, and $\phi m(c)$ is an eigen vector when the square root of the sum of the squares of the vector components for a vector x at the (t)th frame is normalized to 1.

8. An apparatus according to claim 1, in which said normalizing means corrects the phoneme similarity using different normalizing functions associated with the steadiness parameter in accordance with categories of phonemes.

9. A phoneme similarity calculating apparatus comprising:
    means for inputting continuous speech;
    means for dividing the input continuous speech at every predetermined time into divided segments;

means for calculating a steadiness parameter in accordance with a rate of a change in power spectrum of the divided segments over time;

means for calculating a feature parameter vector by frequency-analyzing the divided segments;

means for calculating phoneme information indicating a degree of similarity between the feature parameter vector and each reference phoneme pattern; and means for correcting each phoneme information in accordance with the steadiness parameter as follows: at a portion with high steadiness of input speech, a similarity for a steady reference phoneme being increased and a similarity for an unsteady reference phoneme being decreased, and at a portion with low steadiness of input speech, a similarity for a steady reference phoneme being decreased and a similarity for an unsteady reference phoneme being increased.

10. An apparatus according to claim 9, in which said correcting means comprises:

means for multiplying a first weight function increasing with an increase in the steadiness parameter and the phoneme information when the phoneme is a steady one, and for multiplying a second weight function decreasing with an increase in the steadiness parameter and the phoneme information when the phoneme is not a steady one.

11. An apparatus according to claim 9, in which said feature parameter vector calculating means comprises a filter bank having a plurality of bandpass filters, having different center frequencies, for acoustically analyzing the input speech.

12. An apparatus according to claim 9, in which said steadiness parameter calculating means calculates steadiness parameter $v(t)$ of a (t)th frame as follows:

$$v(t) = \|x(t)\| / \|x(t-T) - x(t)\|$$
$$(\text{if } \|x(t-T) - x(t)\| > 0)$$
$$= \infty \, (\text{if } \|x(t-T) - x(t)\| = 0)$$

where $\|x\|$ is the square root of the sum of the squares of the vector components for a vector x at the (t)th frame of vector x, x(t) is a feature parameter vector of the (t)th frame, and T is an arbitrary period falling within a range of about 10 to 50 msec.

13. An apparatus according to claim 9, in which said similarity calculating means comprises a reference phoneme pattern memory for storing an eigen value and an eigen vector of a covariance matrix of a sample pattern vector associated with each phoneme as a reference pattern of each phoneme, and a circuit for calculating similarity $S^{(c)}[x(t)]$ for each phoneme c in accordance with feature parameter vector x(t) as follows;

$$S^{(c)}[x(t)] = \{\Sigma \lambda m(c) (x(t), \phi m(c))^2\} / \{\lambda 1(c) \|x(t)\|^2\}$$

where $\lambda m(c)$ is an (m)th eigen value of the covariance matrix for phoneme c, $\Sigma$ is a summation in connection with m, x(t) is a feature parameter vector of the (t)th frame, and $\phi m(c)$ is an eigen vector when the square root of the sum of the squares of the vector components for a vector x at the (t)th frame is normalized to 1.

14. An apparatus according to claim 9,, in which said phoneme information calculating means calculates the following Mahalanobis distance $D^{(c)}[x(t)]$ as the similarity:

$$D^{(c)}[x(t)] = (x(t) - \mu(c))\Sigma^{(c)-1}(x(t) - \mu(c))^T \qquad (6)$$

where $\mu(c)$ is an average vector of training sample belonging to a (c)th category, and $\Sigma(c)$ is a covariance matrix of the training samples belonging to a phoneme c.

15. An apparatus according to claim 9, in which said correcting means corrects the phoneme similarity using different normalizing functions associated with the steadiness parameter in accordance with categories of phonemes.

* * * * *